(12) United States Patent
Han et al.

(10) Patent No.: US 10,977,924 B2
(45) Date of Patent: Apr. 13, 2021

(54) INTELLIGENT RIVER INUNDATION ALARMING SYSTEM AND METHOD OF CONTROLLING THE SAME

(71) Applicant: ELECTRONICS AND TELECOMMUNICATIONS RESEARCH INSTITUTE, Daejeon (KR)

(72) Inventors: Seung Wan Han, Daejeon (KR); Seon Ho Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/704,811

(22) Filed: Dec. 5, 2019

(65) Prior Publication Data

US 2020/0184795 A1    Jun. 11, 2020

(30) Foreign Application Priority Data

Dec. 6, 2018    (KR) .......................... 10-2018-0155949
Aug. 13, 2019   (KR) .......................... 10-2019-0099156

(51) Int. Cl.
*G08B 21/00*  (2006.01)
*G08B 21/18*  (2006.01)
*G06T 7/00*   (2017.01)
*G06T 7/10*   (2017.01)

(52) U.S. Cl.
CPC .......... *G08B 21/182* (2013.01); *G06T 7/0002* (2013.01); *G06T 7/10* (2017.01); *G06T 2207/20081* (2013.01); *G06T 2207/30181* (2013.01)

(58) Field of Classification Search
CPC ....... G08B 21/182; G06T 7/10; G06T 7/0002; G06T 2207/20081; G06T 2207/30181
USPC ......................................................... 340/540
See application file for complete search history.

(56) References Cited

U.S. PATENT DOCUMENTS

| 6,816,878 | B1 * | 11/2004 | Zimmers .............. G08B 27/005 340/540 |
| 10,062,170 | B2 | 8/2018 | Kim |
| 2002/0152266 | A1 * | 10/2002 | Burfeind ................ H04L 67/04 709/203 |
| 2003/0052896 | A1 * | 3/2003 | Higgins .................. G06T 17/05 345/619 |
| 2003/0053658 | A1 * | 3/2003 | Pavlidis ........... G08B 13/19608 382/103 |

(Continued)

FOREIGN PATENT DOCUMENTS

| JP | 2005149035 | * | 6/2005 |
| KR | 10-1849730 B1 | | 4/2018 |
| KR | 10-1995107 B1 | | 7/2019 |

*Primary Examiner* — Kerri L McNally
*Assistant Examiner* — Thang D Tran
(74) *Attorney, Agent, or Firm* — Rabin & Berdo, P.C.

(57) ABSTRACT

Provided is a method of controlling an intelligent river inundation alarming system, the method including acquiring river image information from at least one image acquisition device, extracting an analysis target image from the acquired river image information, performing image analysis engine learning on the basis of the extracted analysis target image, analyzing real-time river image information acquired from the image acquisition device using the learned image analysis engine, and determining whether a river is inundated on the basis of a result of the analysis of the real-time river image information.

16 Claims, 7 Drawing Sheets

(56) References Cited

U.S. PATENT DOCUMENTS

| | | | |
|---|---|---|---|
| 2003/0053659 A1* | 3/2003 | Pavlidis | G06K 9/38 |
| | | | 382/103 |
| 2003/0167125 A1* | 9/2003 | Seemann | G01S 7/41 |
| | | | 702/2 |
| 2003/0215129 A1* | 11/2003 | Yang | G06T 7/0002 |
| | | | 382/149 |
| 2003/0227539 A1* | 12/2003 | Bonnery | H04N 19/67 |
| | | | 348/14.1 |
| 2005/0073532 A1* | 4/2005 | Scott | G06Q 10/06 |
| | | | 345/634 |
| 2007/0217655 A1* | 9/2007 | Miyajima | G06K 9/00771 |
| | | | 382/103 |
| 2007/0225955 A1* | 9/2007 | Yamaguchi | G06F 30/20 |
| | | | 703/9 |
| 2012/0127300 A1* | 5/2012 | Yu | H04N 7/183 |
| | | | 348/81 |
| 2013/0182909 A1* | 7/2013 | Rodriguez-Serrano | |
| | | | G06T 7/143 |
| | | | 382/105 |
| 2014/0270522 A1* | 9/2014 | Rae | G06T 3/4038 |
| | | | 382/168 |
| 2015/0003677 A1* | 1/2015 | Cho | G06T 7/0012 |
| | | | 382/103 |
| 2015/0036051 A1* | 2/2015 | Broberg | H04N 9/646 |
| | | | 348/571 |
| 2015/0085194 A1* | 3/2015 | Kanna | H04N 5/91 |
| | | | 348/700 |
| 2015/0221073 A1* | 8/2015 | Matsuyama | G06T 5/50 |
| | | | 382/107 |
| 2015/0264320 A1* | 9/2015 | Yuki | H04N 21/2405 |
| | | | 348/159 |
| 2015/0278627 A1* | 10/2015 | Boriah | G06K 9/209 |
| | | | 382/180 |
| 2016/0047099 A1* | 2/2016 | Zhang | G06Q 10/04 |
| | | | 703/9 |
| 2016/0253883 A1 | 9/2016 | Westmacott et al. | |
| 2016/0358314 A1* | 12/2016 | Ji | H04N 19/167 |
| 2017/0249056 A1* | 8/2017 | Rainey | G06F 16/9537 |
| 2018/0165616 A1* | 6/2018 | Sun | G06F 30/00 |
| 2018/0239948 A1* | 8/2018 | Rutschman | G06T 7/20 |
| 2018/0253954 A1* | 9/2018 | Verma | G08B 25/08 |
| 2018/0373993 A1* | 12/2018 | Petty | G06N 20/20 |
| 2019/0026564 A1 | 1/2019 | Lau et al. | |
| 2019/0056421 A1* | 2/2019 | Lo | G01P 5/001 |
| 2019/0174082 A1* | 6/2019 | Taruki | H04N 5/23222 |
| 2019/0221090 A1* | 7/2019 | Beiser | G06K 9/6274 |

* cited by examiner

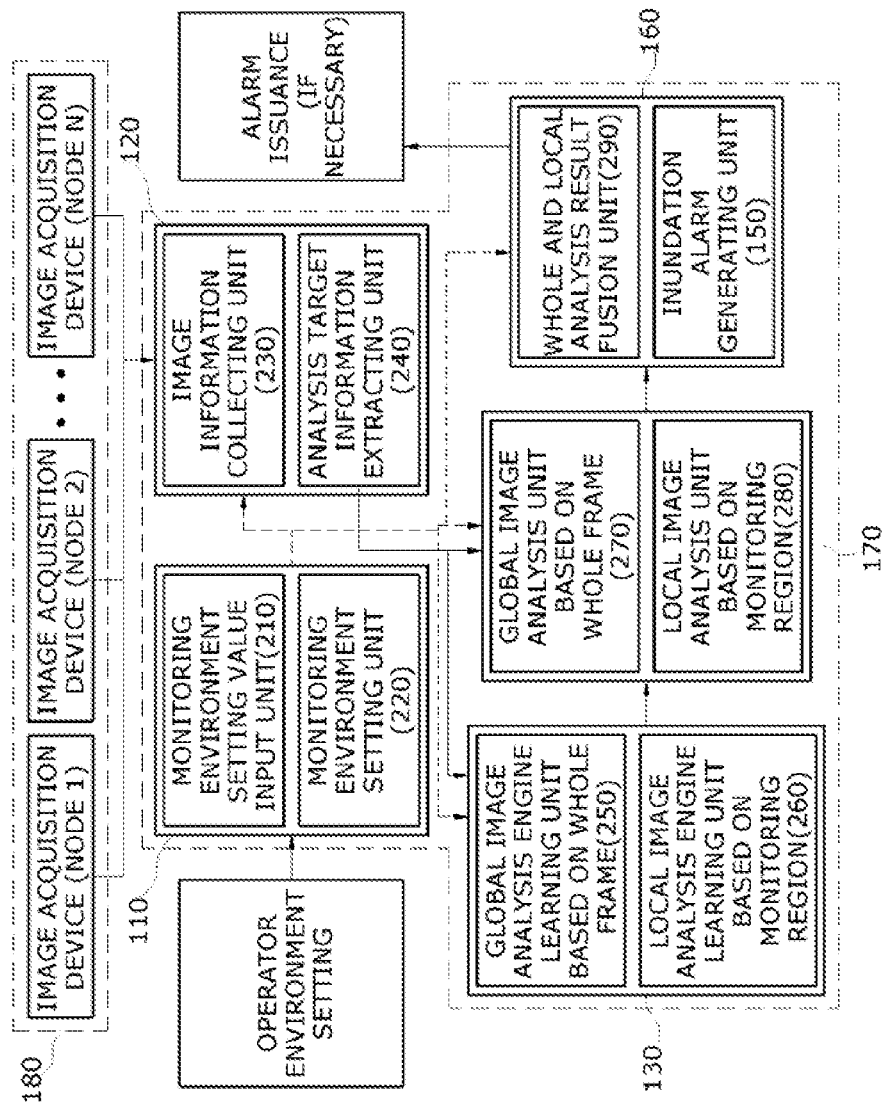

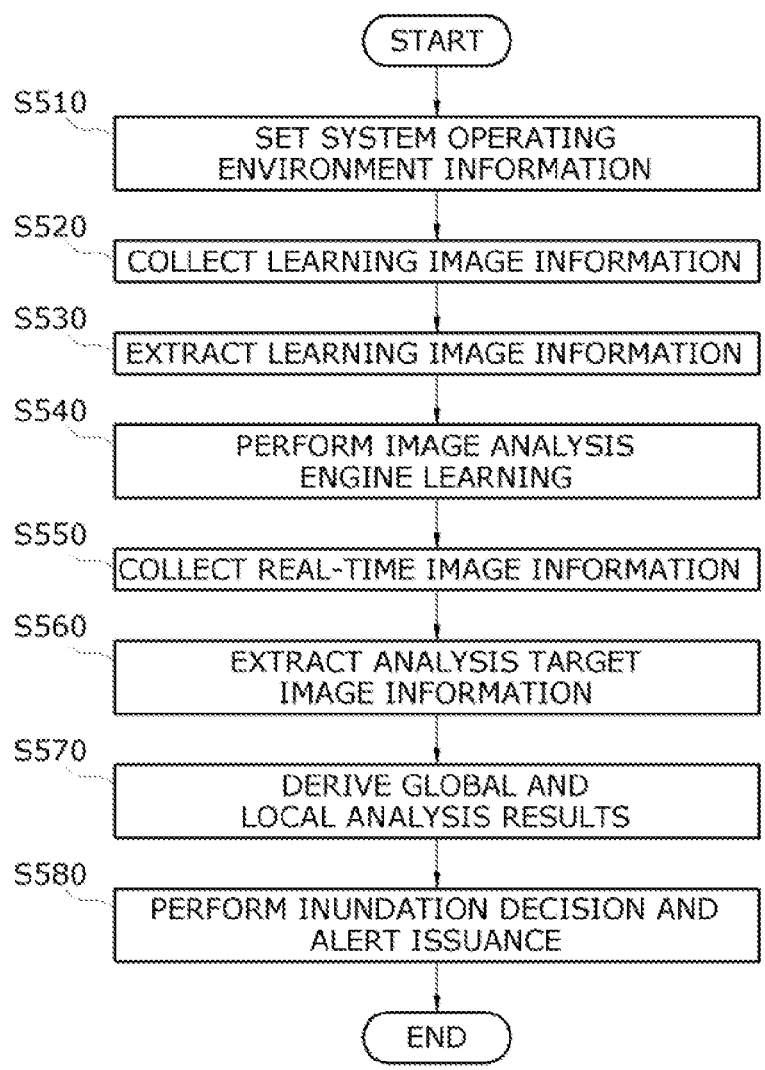

INTELLIGENT RIVER INUNDATION ALARMING SYSTEM AND METHOD OF CONTROLLING THE SAME

CROSS-REFERENCE TO RELATED APPLICATION

This application claims priority to and the benefit of Korean Patent Application No. 10-2018-0155949, filed on Dec. 6, 2018, and Korean Patent Application No. 10-2019-0099156, filed on Aug. 13, 2019, the disclosure of which are incorporated herein by reference in its entirety.

BACKGROUND

1. Field of the Invention

The present invention relates to a river inundation alarming system and a method of controlling the same, and more specifically, to an intelligent river inundation alarming system for detecting river inundation in real time by analyzing an image and generating an alarm in case of emergency, and a method of controlling the same.

2. Discussion of Related Art

Sudden regional heavy rains, typhoons, and urban drainage deterioration are causing rivers and streams to be inundated, resulting in destruction of facilities around rivers and loss of life. Accordingly, in order to prevent flood damage in rivers or streams, methods of predicting a risk of flooding are being studied.

The methods of predicting a flood risk include a meteorological method, a water level method, a rainfall-runoff method, and a meteorological-rainfall-runoff method. Among the methods, the water level method is a method of calculating a change in flow rate downstream according to a change in observed water level upstream in the river, in other words, a method using an empirical formula. The water level method operates in ways that monitors river inundation through visual observation using a water gauge (including a water-level sensor) or a closed-circuit television (CCTV), and if necessary, issues an alarm.

However, the water level sensor is costly in installation and management and has frequent failures and malfunctions, and the visual observation using a CCTV requires experts for observation, which increases related expenses in proportion to the number of rivers to be monitored.

SUMMARY OF THE INVENTION

The present invention provides an intelligent river inundation alarming system capable of automatically detecting river inundation in real time by applying a deep-learning based intelligent image analysis method to river water level-related image information acquired from a closed-circuit television (CCTV), and in the event of river inundation, generating an alarm, and a method of controlling the same.

The technical objectives of the present invention are not limited to the above, and other objectives may become apparent to those of ordinary skill in the art based on the following descriptions.

According to one aspect of the present invention, there is provided a method of controlling an intelligent river inundation alarming system, the method including acquiring river image information from at least one image acquisition device, extracting an analysis target image from the acquired river image information, performing image analysis engine learning on the basis of the extracted analysis target image, analyzing real-time river image information acquired from the image acquisition device using the learned image analysis engine, and determining whether a river is inundated on the basis of a result of the analysis of the real-time river image information.

The method may further include setting system operating environment information including at least one of information about a river monitoring region, a frame rate of analysis of river image information from the image acquisition device, a detection threshold indicating a detection sensitivity of recognizing a change in a river image, an alarm level of river inundation, and a learning coefficient for generating the image analysis engine.

The analysis target image may include at least one of a global image that is an entire area of a frame and a local image corresponding to one or more monitoring regions in the frame.

The learning of the image analysis engine may include learning the image analysis engine on the global image of the frame and learning the image analysis engine on the local image of the frame.

The analyzing of the real-time river image information may include performing global image analysis on the frame on the basis of the image analysis engine learned on the global image of the frame and performing local image analysis on the frame on the basis of the image analysis engine learned on the local image of the frame.

The method may further include issuing a river inundation alarm when a river is determined to be inundated in the determining of whether a river is inundated.

According to another aspect of the present invention, there is provided an intelligent river inundation alarming system including a system operating environment setting unit configured to receive and set system operating environment information; an image information collecting unit configured to acquire river image information from at least one image acquisition device on the basis of the system operating environment information from the system operating environment setting unit, an image analysis engine learning unit configured to receive the river image information from the image information collecting unit, extract learning image information, and perform image analysis engine learning, an image analysis unit configured to analyze real-time river image information frame from the image acquisition device using the learned image analysis engine, an inundation determining unit configured to determine whether a river is inundated on the basis of a result of the analysis of the real-time river image information frame by the image analysis unit, and an inundation alarm generating unit configured to generate a river inundation alarm when a river is determined to be inundated by the inundation determining unit.

The intelligent river inundation alarming system may further include a system control unit configured to control the system operating environment setting unit, the image information collecting unit, the image analysis engine learning unit, the image analysis unit, the inundation determining unit, and the inundation alarm generating unit.

The system operating environment information may include information about a river monitoring region, a frame rate of analysis of river image information from the image acquisition device, a detection threshold indicating a detection sensitivity of recognizing a change in a river image, an alarm level of river inundation, and a learning coefficient for generating the image analysis engine.

The image information collecting unit may extract an analysis target image from a frame of the acquired river image information on the basis of the system operating environment information.

The image analysis engine learning unit may include a global image analysis engine learning unit configured to perform learning on a global image among the extracted analysis target images and a local image analysis engine learning unit configured to perform learning on a local image of a frame of the extracted analysis target image.

The global image analysis engine learning unit may perform global image analysis engine learning on the basis of the global image of the frame and a learning label from the system operating environment setting unit.

The local image analysis engine learning unit may perform local image analysis engine learning on the basis of the local image of the frame and a learning label from the system operating environment setting unit.

The image analysis unit may include a global image analysis unit configured to derive a global analysis result value with respect to an entirety of the frame using the learned global image analysis engine and a local image analysis unit configured to derive a local analysis result value with respect to the local images using the learned local image analysis engine.

The inundation determining unit may include a global and local analysis result fusion unit configured to fuse a global analysis result value and a local analysis result value to derive a total fusion analysis result value.

The inundation determining unit may determine whether a river is inundated on the basis of the global analysis result value, the local analysis result value, and the system operating environment information.

According to another aspect of the present invention, there is provided a method of determining a river inundation, the method including acquiring river image information in real time from at least one image acquisition device, segmenting and analyzing at least a partial frame of the river image information in a global manner and a local manner using a learned image analysis engine, and performing comparison with an alarm generation value at each determination of river inundation on the basis of a total fusion analysis result value with respect to a global analysis result and a local analysis result during a predetermined observation interval and a detection threshold indicating a detection sensitivity to derive one or more result values of whether a river is inundated.

The method may further include determining, among the one or more result values of whether the river is inundated, the result value corresponding to a highest level to be a final result value.

BRIEF DESCRIPTION OF THE DRAWINGS

FIG. 2 is a block diagram for describing an intelligent river inundation alarming system according to another embodiment of the present invention.

FIG. 5 is a flowchart for describing a method of controlling an intelligent river inundation alarming system according to an embodiment of the present invention.

DETAILED DESCRIPTION OF EXEMPLARY EMBODIMENTS

Figure 1:
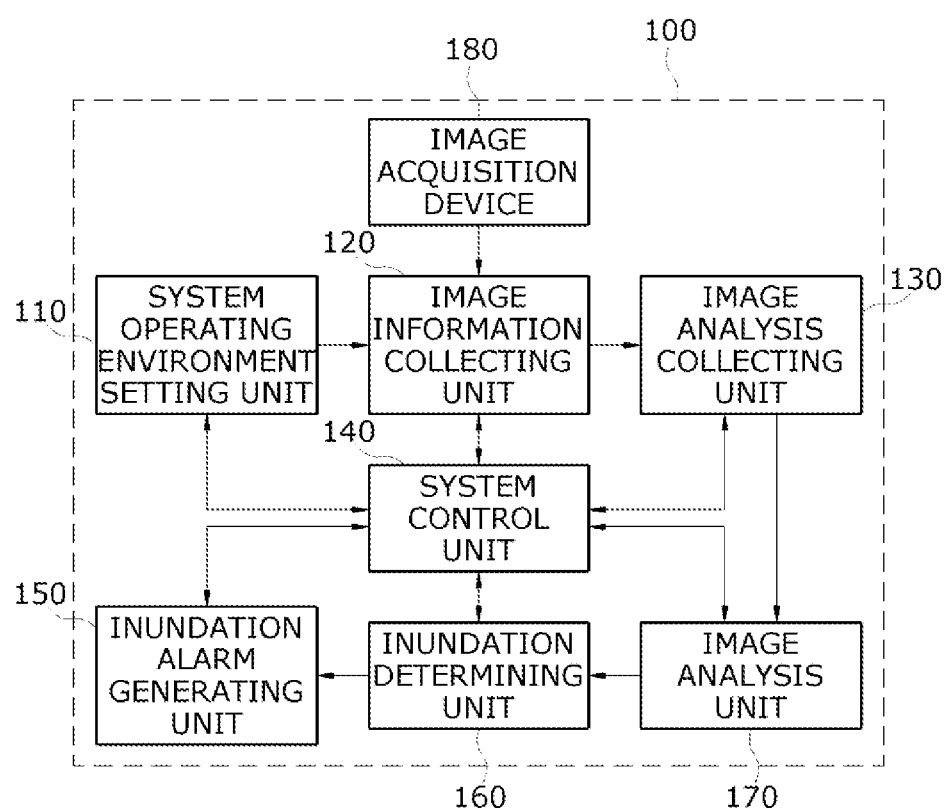
FIG. 1 is a block diagram for describing an intelligent river inundation alarming system according to an embodiment of the present invention.

While the present invention is susceptible to various modifications and alternative embodiments, specific embodiments thereof are shown by way of example in the accompanying drawings and will be described. However, it should be understood that there is no intention to limit the present invention to the particular embodiments disclosed, but on the contrary, the present invention is to cover all modifications, equivalents, and alternatives falling within the spirit and scope of the present invention.

It will be understood that, although the terms first, second, etc. may be used herein to describe various elements, the elements should not be limited by the terms. The terms are only used to distinguish one element from another. For example, a first element could be termed a second element, and, similarly, a second element could be termed a first element without departing from the scope of the present invention. As used herein, the term "and/or" includes any one or combination of a plurality of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described with reference to the accompanying drawings in detail. For better understanding of the present invention, the same reference numerals are used to refer to the same elements through the description of the figures, and the description of the same elements will be omitted.

FIG. 1 is a block diagram for describing an intelligent river inundation alarming system according to an embodiment of the present invention.

Referring to FIG. 1, an intelligent river inundation alarming system 100 according to the embodiment of the present invention includes a system operating environment setting unit 110 configured to receive and set operating environment information of the intelligent river inundation alarming system 100, an image information collecting unit 120, an image analysis engine learning unit 130, an image analysis unit 170, an inundation determining unit 160, an inundation alarm generating unit 150, a system control unit 140, and one or more image acquisition devices 180.

The system operating environment setting unit 110 receives input regarding a monitoring region (the whole area or a specific area) photographed by the image acquisition device 180 for detecting whether a river is inundated from a system operator (including a user) and sets the received input. In addition, the system operating environment setting unit 110 receives an analysis interval (frames per second) of river image information transmitted from the image acquisition device 180, and a detection threshold indicating a detection sensitivity of river inundation (a detection sensitivity of recognizing a change in a river image) from the system operator and sets the received analysis interval and detection threshold. The image acquisition device 180 includes one or more image acquisition devices, such as a closed-circuit television (CCTV).

The system operating environment setting unit 110 may be implemented to include a monitoring environment setting value input unit 210 and a monitoring environment setting unit 220. The monitoring environment setting value input unit 210 may receive system operating environment information from the system operator, and the monitoring environment setting unit 220 may manage the received system operating environment information.

In addition, the system operating environment setting unit 110 receives input regarding an alarm level for inundation detection from the system operator and sets the received alarm level. The alarm level for inundation detection may be set in three levels (normal, caution, and warning), four levels (safe, caution, alert, danger), five levels (normal, caution, alert, pre-flooding, flooding), or the like, and the alarm level may be set to be different from the above. In addition, the system operating environment setting unit 110 may receive a learning coefficient used to generate an image analysis engine, an alarm generation criterion value used to determine river inundation, and the like from the system operator and set the received learning coefficient, the alarm generation criterion value, and the like.

The system operating environment information set by the system operating environment setting unit 110 is transmitted to each module that requires the operating environment information in the intelligent river inundation alarming system 100 by the system control unit 140, and each module operates on the basis of or with reference to the received operating environment information.

The image information collecting unit 120 acquires a river image information frame (for example, a CCTV image of a river basin) from the one or more image acquisition devices 180 on the basis of the system operating environment information transmitted from the system operating environment setting unit 110. The image information collecting unit 120 extracts information for detecting river inundation from the acquired image information frame.

Referring to FIG. 2, the image information collecting unit 120 may be implemented to include an image information collecting unit 230 and an analysis target information extracting unit 240. The image information collecting unit 230 receives river image information frames continuously provided from the image acquisition device 180 and stores the received river image information frames, and the analysis target information extracting unit 240 extracts an analysis target image on the basis of the stored river image information and the set monitoring region and analysis interval information set by the system operator.

The analysis target information extracting unit 240 extracts an analysis target image from the acquired river image information frame for each image range set from the system operating environment information. For example, the analysis target information extracting unit 240 may extract an analysis target image for each of an image (a global image) of the whole area of a frame included in river image information frames photographed by the image acquisition device 180 and an image (a local image) obtained by segmenting the whole area of the frame by a predetermined reference. The local image may be divided into a local image of a monitoring image corresponding to an area available for detecting whether a river is inundated and other local images.

The analysis target image (the global image and/or the local image) extracted by the analysis target information extracting unit 240 is transmitted to the image analysis engine learning unit 130 by the system control unit 140, which will be described below, for river inundation determination learning. The image analysis engine learning unit 130 may be implemented to include a whole frame based global image analysis engine learning unit 250 (hereinafter, referred to as a global image analysis engine learning unit) and a monitoring region based local image analysis engine learning unit 260 (hereinafter, referred to as a local image analysis engine learning unit) as shown in FIG. 2.

The global image analysis engine learning unit 250 learns an analysis engine on the global image of the frame, and the local image analysis engine learning unit 260 learns an analysis engine on the local image of the frame set as a monitoring region.

Figure 3A:
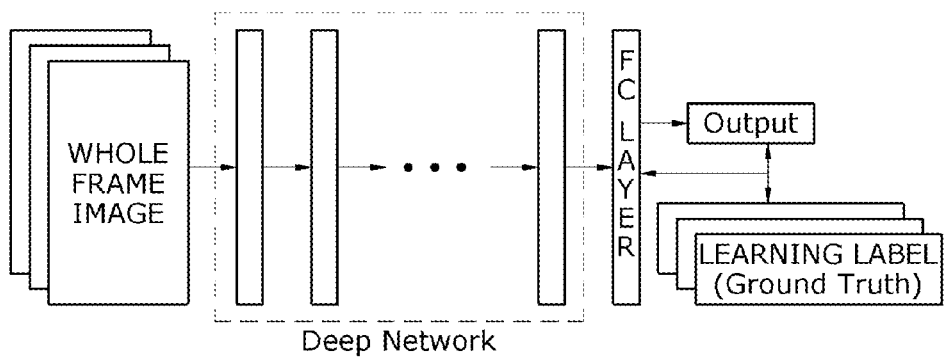
FIG. 3A is a conceptual diagram for describing a global image analysis engine learning unit according to an embodiment of the present invention.
Figure 3B:
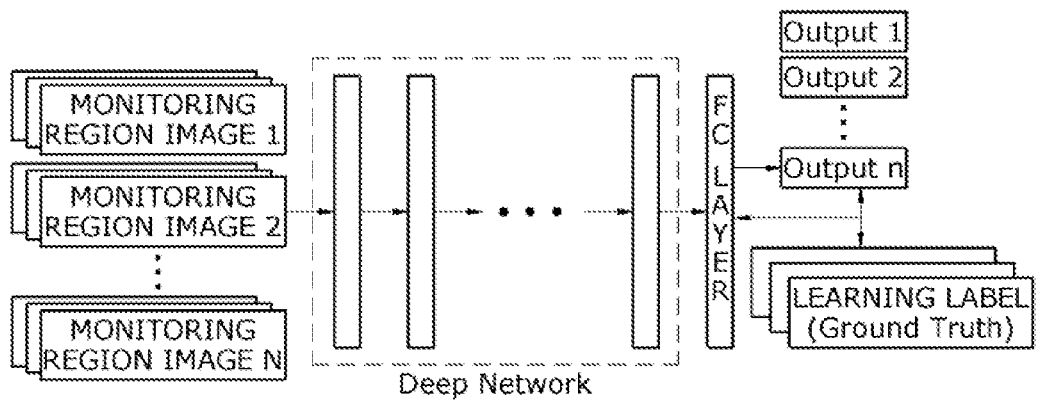
FIG. 3B is a conceptual diagram for describing a local image analysis engine learning unit according to an embodiment of the present invention.

The global image analysis engine learning unit 250 of the image analysis engine learning unit 130 according to the embodiment of the present invention learns a global image analysis engine using a deep-learning technique shown in FIG. 3A. The local image analysis engine learning unit 260 of the image analysis engine learning unit 130 according to the embodiment of the present invention learns a local image analysis engine using a deep-learning technique shown in FIG. 3B.

The intelligent river inundation alarming system 100 according to the embodiment of the present invention includes the image analysis unit 170 configured to analyze a real-time river image information frame transmitted from the image acquisition device 180 using the image analysis engine (the learned global image analysis engine and the learned local image analysis engine) learned by the image analysis engine learning unit 130.

The image analysis unit 170 may be implemented to include a whole frame based global image analysis unit 270

(hereinafter, referred to as a global image analysis unit) and a monitoring region based local image analysis unit 280 (hereinafter, referred to as a local image analysis unit) as shown in FIG. 2.

The global image analysis unit 270 calculates a global analysis result value with respect to a whole frame image (a global image) using the global image and the global image analysis engine learned by the global image analysis engine learning unit 250, and the local image analysis unit 280 calculates a local analysis result value with respect to monitoring regions using images (local images) corresponding to monitoring regions in a frame and the local image analysis engine learned by the local image analysis engine learning unit 260.

Figure 4A:
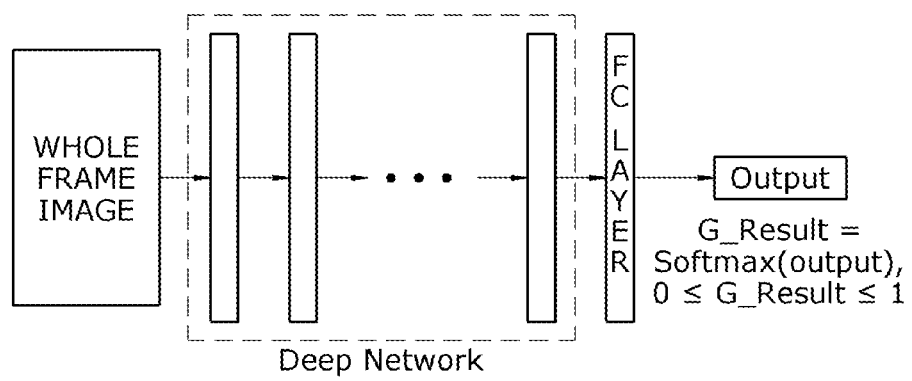
FIG. 4A is a conceptual diagram for describing global image analysis according to an embodiment of the present invention.
Figure 4B:
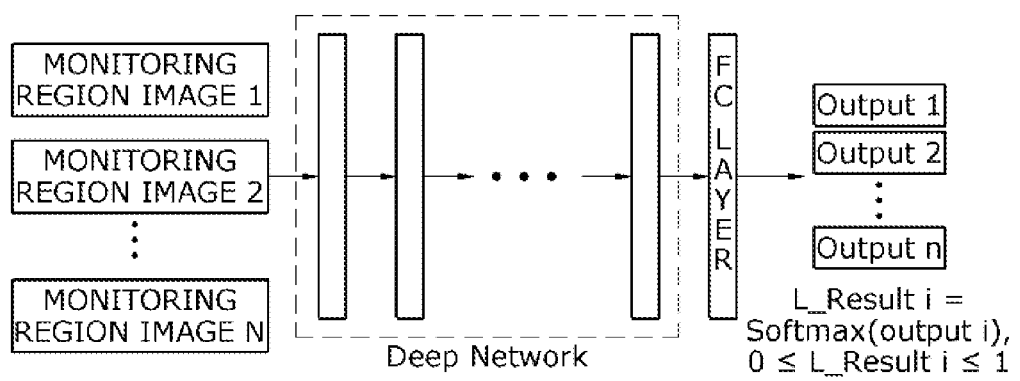
FIG. 4B is a conceptual diagram for describing local image analysis according to an embodiment of the present invention.

The global image analysis unit 270 of the image analysis unit 170 according to the embodiment of the present invention analyzes a global image using a deep-learning technique shown in FIG. 4A and derives a global analysis result value G_Result. The local image analysis unit 280 of the image analysis unit 170 according to the embodiment of the present invention analyzes one or more local images using a deep-learning technique shown in FIG. 4B and derives a local analysis result value L_Result.

The intelligent river inundation alarming system 100 according to the embodiment of the present invention includes the inundation determining unit 160 configured to determine whether a river is inundated on the basis of real-time river image information frame analysis of the image analysis unit 170. The inundation determining unit 160 derives a total fusion analysis result value by fusing the global analysis result value and the local analysis result value received from the image analysis unit 170 on the basis of the system operating environment information set by the system operator and determines whether a river is inundated on the basis of the total fusion analysis result value.

For example, the inundation determining unit 160 determines whether a river is inundated on the basis of the total fusion analysis result values of n frames and system operating environment information (a detection threshold, an alarm generation condition, alarm generation level information, and the like) set by the system operator. A detailed procedure of determining river inundation on the basis of fusion of the global analysis result values and the local analysis result values of the n frames by the inundation determining unit 160 will be described below.

The intelligent river inundation alarming system 100 according to the embodiment of the present invention includes an inundation alarm generating unit 150 configured to generate a river inundation alarm under the control of the system control unit 140, which will be described below, when river inundation is determined to occur on the basis of the fusion of the global analysis result values and the local analysis result values of the n frames by the inundation determining unit 160.

The inundation alarm generating unit 150 performs alarm issuance on the basis of the control of the system control unit 140 when the inundation determining unit 160 determines that the river is inundated. The alarm may be expressed on the basis of the system operating environment information. For example, the alarm may be expressed in the form of a graphical user interface (GUI), or in the form of an alarm sound. In addition, the alarm may be expressed in the form of alarm text and broadcast to the operator and residents around the river through wired or wireless communication. Meanwhile, the inundation determining unit 160 and the inundation alarm generating unit 150 may be implemented as one module, and the inundation determining unit 160 may also be implemented to perform river inundation determination together with alarm generation.

The system control unit 140 receives the set system operating environment information from the system operating environment setting unit 110 and controls each module of the intelligent river inundation alarming system 100 on the basis of the received system operating environment information and performs information exchange between the respective modules and identification of states of the modules. Hereinafter, a method of determining river inundation and generating an alarm by controlling an intelligent river inundation alarming system according to an embodiment of the present invention will be described.

FIG. 5 is a flowchart for describing a method of controlling an intelligent river inundation alarming system according to an embodiment of the present invention.

The method of controlling the intelligent river inundation alarming system 100 according to the embodiment of the present invention is involved in controlling determination of river inundation and alarm generation by controlling the intelligent river inundation alarming system 100 shown in FIG. 1.

Figure 6:
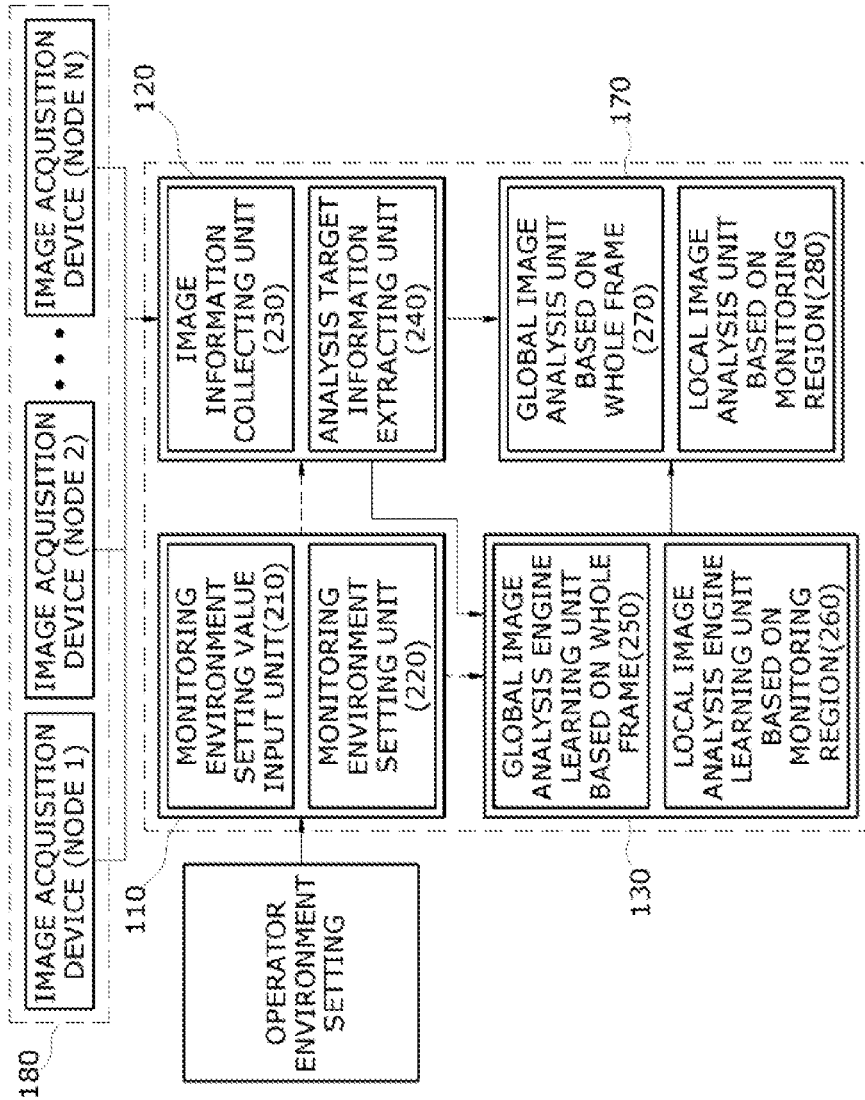
FIG. 6 is a flowchart for describing image learning of an intelligent river inundation alarming system according to another embodiment of the present invention.

First, the system operating environment setting unit 110 receives system operating environment information from a system operator and identifies the received system operating environment information (hereinafter, the identifying of the system operating environment information will be referred to as setting the system operating environment information) (S510). Referring to FIG. 6, the system operating environment setting unit 110 receives the system operating environment information through the monitoring environment setting value input unit 210 and identifies the system operating environment information through the monitoring environment setting unit 220.

The set system operating environment information is transmitted to a module related thereto among the image information collecting unit 120, the image analysis engine learning unit 130, the image analysis unit 170, the inundation determining unit 160, and the inundation alarm generating unit 150 by the system control unit 140 and is used as control information regarding an operation of the corresponding module. As described above, the system operating environment information includes information about a monitoring region (the whole area or a specific area) photographed by the image acquisition device 180, an analysis interval (frames per second) of the acquired river image information, and a detection threshold indicating a detection sensitivity of river inundation (detection sensitivity of recognizing a change in a river image), an alarm level for inundation detection, a learning coefficient used to generate an image analysis engine, an alarm generation criterion value used to determine river inundation, and the like.

The image information collecting unit 120 collects learning image information from the image acquisition device 180 on the basis of the set system operating environment information (S520) and extracts learning target image information from the learning image information (the learning image may be an image previously acquired from another image acquisition device) (S530). The image information collecting unit 120 may perform an image collecting operation and an analysis target information extracting operation through the image information collecting unit 230 and the analysis target information extracting unit 240, respectively, as shown in FIG. 6.

The image analysis engine learning unit 130 performs image analysis engine learning on the basis of the learning target image information received from the image information collecting unit 120 and the system operating environment information (S540). The performing of the image analysis engine learning includes performing a global image analysis engine learning on the basis of the whole area image of a frame and a learning label thereof and performing a local image analysis engine learning on the basis of local image information corresponding to a monitoring region of the frame and a learning label thereof.

The image analysis engine learning unit 130 performs the global image analysis engine learning and the local image analysis engine learning in the global image analysis engine learning unit 250 and the local image analysis engine learning unit 260, respectively, as shown in FIG. 6. The global image analysis engine learning and the local image analysis engine learning may be performed using the deep-learning techniques shown in FIGS. 3A and 3B.

By using the image analysis engine learned through the above procedure (the learned global image analysis engine and the learned local image analysis engine), the image analysis unit 170 analyzes a real-time river image information frame acquired from the image acquisition device 180 and determines whether the river is inundated. In detail, the image analysis unit 170 receives and collects real-time image information acquired from the image acquisition device 180 (S550) and extracts analysis target image information from the collected real-time image information (S560). The extracted analysis target image information may include global image information and local image information.

The image analysis unit 170 derives a global analysis result and a local analysis result on the basis of the received analysis target image information (S570). For example, the global image analysis unit 270 of the image analysis unit 170 derives a global analysis result value G_Result with respect to the whole frame using the global image and the global image analysis engine provided from the global image analysis engine learning unit 250 as shown in FIG. 6.

In addition, the local image analysis unit 280 of the image analysis unit 170 calculates and derives a local analysis result value L_Result with respect to monitoring regions using local images and the local image analysis engine provided from the local image analysis engine learning unit 260 as shown in FIG. 6.

The derived global analysis result value and local analysis result value are transmitted to the inundation determining unit 160, and the inundation determining unit 160 derives a result value (referred to as a total fusion analysis result value) by fusing the global analysis result value and the local analysis result value received from the image analysis unit 170 on the basis of the system operating environment information set by the system operator, determines whether the river is inundated on the basis of the total fusion analysis result value, and performs a river inundation alarm issuance in response to determining occurrence of river inundation (S580).

Figure 7:
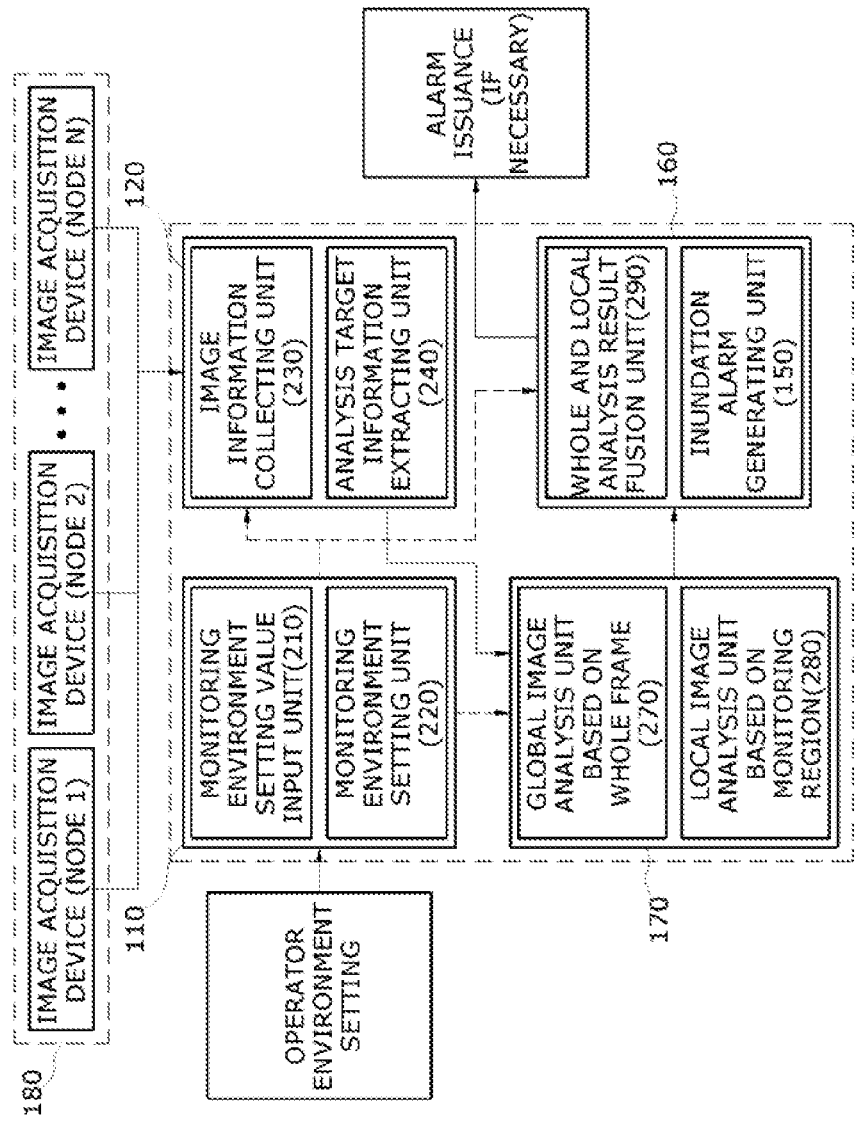
FIG. 7 is a conceptual diagram for describing image analysis of an intelligent river inundation alarming system according to another embodiment of the present invention.

For example, referring to FIG. 7, a global and local analysis result fusion unit 290 fuses the global analysis result value and the local analysis result value, determines whether the river is inundated on the basis of a result of the fusion, and performs alarm issuance in various forms (GUI, alarm sound, alarm text, and the like) as described above. Hereinafter, a process of analyzing an image and determining inundation by the river inundation alarming system according to the embodiment will be described in more detail.

An image analysis derivation method by the river inundation alarming system according to the embodiment of the present invention is expressed as Equation 1. By using a global analysis result value G_Result$_i$ of an i$^{th}$ frame frame$_i$, a local analysis result value L_Result$_{ij}$ of a j$^{th}$ monitoring region region$_j$ of the i$^{th}$ frame frame$_i$, and a fusion weight with respect to each of the analysis result values, a total fusion analysis result value Final_Result$_i$ according to fusion of the i$^{th}$ frame frame$_i$ is obtained as shown in Equation 1.

$$\text{Final\_Result}_i = w_{i0} \times \text{G\_Result}_i + w_{i1} \times \text{L\_Result}_{ij} + \ldots + w_{ij} \times \text{L\_Result}_{ij} + \ldots + w_{in} \times \text{L\_Result}_{in},$$ [Equation 1]

provided that $1 = w_{i0} + w_{i1} + \ldots + w_{ij} + \ldots + w_{in}$

Here, $w_{i0}$ is a fusion weight for the global analysis result value of the i$^{th}$ frame frame$_i$, and $w_{ij}$ is a fusion weight for the local analysis result value of the j$^{th}$ monitoring region of the i$^{th}$ frame frame$_i$.

The total fusion analysis result value Final_Result$_i$ of the i$^{th}$ frame frame$_i$ derived using Equation 1 is transmitted to the inundation alarm generating unit 150, and the inundation alarm generating unit 150 performs determination of river inundation and determination whether to generate an alarm using the total fusion analysis result values from the n frames and a detection threshold indicating a detection sensitivity, an alarm generation criterion, and alarm generation level information that are previously set by the system operator (a user), in which such a decision and determination may be implemented to be performed by the system control unit 140, and the inundation alarm generating unit 150 is controlled thereby.

A method of determining river inundation by the river inundation alarming system according to the embodiment of the present invention may include extracting m image frames each second when an observation interval for detecting inundation is t secs and determining whether the river is inundated on the basis of n frames (n=t×m). That is, on the basis of a set of total fusion analysis result values of the n frames FR={Final_Resul$_1$, . . . , Final_Result$_i$} and a set of S detection thresholds Threshold={Threshold$_1$, . . . , Threshold$_s$}, a set of determination condition functions Condition={Condition$_1$, . . . , Condition$_k$} of river inundation determination levels (k levels) is obtained. In this case, at each of the river inundation determination levels, a comparison with a preset alarm generation value Alarm_Threshold is performed to determine whether the river is inundated.

As shown in Equation 2, a determination result corresponding to the highest level among the determination results is determined to be a final determination result Result. When the final determination result is 0, it is considered the safest state.

$$\text{Result} = \text{argmax } f(x) := \{x | \text{condition}_x(FR, \text{Threshold}) > \text{Alarm}_{Threshhold} : 1 \leq x \leq k\}$$ [Equation 2]

or Result=0; if argmax f(x) doesn't exist

For example, when the inundation detection observation interval t is 10 seconds and five image frames are extracted each second (m=5), the number of image analysis frames n is 50 (n=10×5). Accordingly, a set of total fusion analysis result values FR={Final_Result$_1$, . . . , Final_Result$_{50}$} for the fifty frames is considered. Assuming four detection thresholds each indicating a detection sensitivity of recognizing a change in a river image (S=4), a set of the detection thresholds is provided as Threshold={Threshold$_1$, . . . , Threshold$_4$}={Sensitivity 1, Sensitivity 2, Sensitivity 3, Sensitivity 4}, in which Sensitivity 1>Sensitivity 2>Sensitivity 3>Sensitivity 4.

In addition, in the set of determination condition functions, Condition={Condition$_1$, . . . , Condition$_k$}, the risk of inundation is determined in k levels using a previously set alarm generation value Alarm_Threshold. In the case of k=5, the risk of inundation is set in five levels of normal, caution, alert, pre-flooding, and flooding, and river inundation determination is performed from the set of determination condition functions. The alarm generation value Alarm_Threshold is a threshold of a determination condition of each of the river inundation risk determination levels and indicates a sensitivity of each of the river inundation risk determination levels.

For example, in the case of a caution-level among the five river inundation risk determination levels, the determination condition function has a result value larger than or equal to 0.6 (an alarm generation value of the caution-level), the caution-level is confirmed, and in the case of an alert-level among the five river inundation risk determination levels, when the determination condition function has a result value larger than or equal to 0.7 (an alarm generation value of the alert-level), the alert-level is confirmed.

The final river inundation state result value (Result) obtained as the above procedure is provided as an index value with respect to a degree of risk set in advance (the river inundation risk determination level), and when the river inundation is determined in five levels (k=5) as described above, a possible set of result values is provided as {Result=0 (normal), Result=1 (caution), Result=2 (alert), Result=3 (pre-flooding), Result=4 (flooding)}, and the final determination result Result is derived as a highest value among result values derived through the respective determination condition functions.

Meanwhile, the above-described components have been described as separate devices but are to be regarded as illustrative to aid in the explanation and understanding of the present invention and may be implemented in various forms within the scope and spirit of the present invention. For example, the inundation determining unit 160 and the inundation alarm generating unit 150 may be implemented as an integrated single module, or as two or more separate devices.

The methods according to the present invention may be implemented in the form of program commands executable by various computer devices and may be recorded in a computer readable media. The computer readable media may be provided with program commands, data files, data structures, and the like alone or as a combination thereof. The program commands stored in the computer readable media may be those specially designed and constructed for the purposes of the present invention or may be of the kind well-known and available to those having skill in the computer software arts.

Examples of the computer readable storage medium include a hardware device constructed to store and execute a program command, for example, a read only memory (ROM), a random-access memory (RAM), and a flash memory. The program command may include a high-level language code executable by a computer through an interpreter in addition to a machine language code made by a compiler. The described hardware devices may be configured to act as one or more software modules in order to perform the operations of the present invention, or vice versa.

The embodiments according to the present invention recorded in a computer recoding medium may be applied to a computer system. The computer system may include at least one processor, a memory, a user input device, a user output device, and a storage unit. The above described components perform communication through a bus. In addition, the computer system may further include a network interface coupled to a network. The processor may be a central processing unit (CPU) or a semiconductor device for processing instructions stored in the memory and/or storage unit. The memory and the storage unit may include various forms of volatile or nonvolatile media. For example, the memory may include a read only memory (ROM) or a random-access memory (RAM). Accordingly, the embodiments of the present invention may be embodied as a method implemented by a computer or a non-transitory computer readable media including program executable instructions stored in the computer. When executed by a processor, computer readable commands may perform a method according to at least one aspect of the present invention.

As is apparent from the above, whether a plurality of rivers are inundated is automatically detected in real time by applying a deep-learning based intelligent image analysis method to river water level related image information acquired from a CCTV in real time and an alarm is issued so that inundation detection of a plurality of rivers can be performed with a minimum number of agents and if necessary, alarm issuance can be immediately performed.

Although the constructions of the present invention have been described in detail with reference to the embodiments, the above embodiments should be regarded as illustrative rather than limiting in all aspects. A person of ordinary skill in the art should appreciate that various modifications and equivalents derived from the teaching and suggestion of the above specification fall within the scope and sprit of the present invention. Therefore, the scope of the present invention is defined by the appended claims of the present invention.

What is claimed is:

1. A method of controlling an intelligent river inundation alarming system, the method comprising:
    acquiring river image information from at least one image acquisition device;
    extracting an analysis target image from the acquired river image information;
    performing image analysis engine learning on the basis of the extracted analysis target image;
    analyzing real-time river image information acquired from the image acquisition device using the learned image analysis engine; and
    determining whether a river is inundated on the basis of a result of the analysis of the real-time river image information;
    wherein the analysis target image includes at least one of a global image that is an entire area of a frame and a local image corresponding to one or more monitoring regions in the frame.

2. The method of claim 1, further comprising setting system operating environment information including at least one of information about a river monitoring region, a frame rate of the analysis of the river image information from the image acquisition device, a detection threshold indicating a detection sensitivity of recognizing a change in a river image, an alarm level of river inundation, and a learning coefficient for generating the image analysis engine.

3. The method of claim 1, wherein the learning of the image analysis engine includes:
    learning the image analysis engine on the global image of the frame and
    learning the image analysis engine on the local image of the frame.

4. The method of claim 3, wherein the analyzing of the real-time river image information includes:
performing global image analysis on the frame on the basis of the image analysis engine learned on the global image of the frame; and
performing local image analysis on the frame on the basis of the image analysis engine learned on the local image of the frame.

5. The method of claim 1, further comprising issuing a river inundation alarm when a river is determined to be inundated in the determining of whether a river is inundated.

6. An intelligent river inundation alarming system comprising a processor and a computer-readable medium storing instructions configured to, when executed by the processor, implement:
a system operating environment setting unit configured to receive and set system operating environment information;
an image information collecting unit configured to acquire river image information from at least one image acquisition device on the basis of the system operating environment information from the system operating environment setting unit;
an image analysis engine learning unit configured to receive the river image information from the image information collecting unit, extract learning image information, and perform image analysis engine learning;
an image analysis unit configured to analyze real-time river image information frame from the image acquisition device using the learned image analysis engine;
an inundation determining unit configured to determine whether a river is inundated on the basis of a result of the analysis of the real-time river image information frame by the image analysis unit; and
an inundation alarm generating unit configured to generate a river inundation alarm when a river is determined to be inundated by the inundation determining unit;
wherein the image analysis engine learning unit includes:
a global image analysis engine learning unit configured to perform learning on a global image of a frame of the extracted analysis target image; and
a local image analysis engine learning unit configured to perform learning on a local image, which is a monitoring region, of the frame of the extracted analysis target image.

7. The intelligent river inundation alarming system of claim 6, wherein the instructions are further configured to, when executed by the processor, implement a system control unit configured to control the system operating environment setting unit, the image information collecting unit, the image analysis engine learning unit, the image analysis unit, the inundation determining unit, and the inundation alarm generating unit.

8. The intelligent river inundation alarming system of claim 6, wherein the system operating environment information includes information about a river monitoring region, a frame rate of analysis of river image information from the image acquisition device, a detection threshold indicating a detection sensitivity of recognizing a change in a river image, an alarm level of river inundation, and a learning coefficient for generating the image analysis engine.

9. The intelligent river inundation alarming system of claim 8, wherein the image information collecting unit extracts an analysis target image from a frame of the acquired river image information on the basis of the system operating environment information.

10. The intelligent river inundation alarming system of claim 6, wherein the global image analysis engine learning unit performs global image analysis engine learning on the basis of the global image of the frame and a learning label from the system operating environment setting unit.

11. The intelligent river inundation alarming system of claim 6, wherein the local image analysis engine learning unit performs local image analysis engine learning on the basis of the local image of the frame and a learning label from the system operating environment setting unit.

12. The intelligent river inundation alarming system of claim 10, wherein the image analysis unit includes a global image analysis unit configured to derive a global analysis result value with respect to an entirety of the frame using the learned global image analysis engine and a local image analysis unit configured to derive a local analysis result value with respect to the local images using the learned local image analysis engine.

13. The intelligent river inundation alarming system of claim 6, wherein the inundation determining unit includes a global and local analysis result fusion unit configured to fuse a global analysis result value and a local analysis result value to derive a total fusion analysis result value.

14. The intelligent river inundation alarming system of claim 13, wherein the inundation determining unit determines whether a river is inundated on the basis of the global analysis result value, the local analysis result value, and the system operating environment information.

15. A method of determining a river inundation, the method comprising:
acquiring river image information in real time from at least one image acquisition device;
segmenting and analyzing at least a partial frame of the river image information in a global manner and a local manner using a learned image analysis engine; and
performing comparison with an alarm generation value at each determination of river inundation on the basis of a total fusion analysis result value with respect to a global analysis result and a local analysis result during a predetermined observation interval and a detection threshold indicating a detection sensitivity to derive one or more result values of whether a river is inundated.

16. The method of claim 15, further comprising determining, among the one or more result values of whether the river is inundated, the result value corresponding to a highest level to be a final result value.

* * * * *